United States Patent
Cox

[15] 3,669,164
[45] June 13, 1972

[54] DUAL BELT MACHINE FOR TRIMMING PROJECTIONS FROM GLOBULAR ARTICLES

[72] Inventor: James P. Cox, Burnaby, British Columbia, Canada
[73] Assignee: John Inglis Frozen Foods Company, Modesto, Calif.
[22] Filed: July 6, 1970
[21] Appl. No.: 52,563

Related U.S. Application Data

[62] Division of Ser. No. 707,152, Feb. 21, 1968, Pat. No. 3,538,969.

[52] U.S. Cl. ................................................146/81, 146/55
[51] Int. Cl. ........................................................A23n 15/02
[58] Field of Search...................146/81, 83, 55, 85, 27, 224

[56] References Cited

UNITED STATES PATENTS

| 3,400,740 | 9/1968 | Akesson | 146/55 X |
| 3,388,731 | 6/1968 | Reisterer et al. | 146/55 X |
| 3,032,086 | 5/1962 | Daugherty | 146/81 X |
| 3,230,990 | 1/1966 | Van Der Vijver | 146/83 |

FOREIGN PATENTS OR APPLICATIONS

| 1,390,924 | 1/1965 | France | 146/55 |
| 866,226 | 4/1961 | Great Britain | 146/83 |

Primary Examiner—Andrew R. Juhasz
Assistant Examiner—Z. R. Bilinksy
Attorney—Robert W. Beach

[57] ABSTRACT

By engagement of pad means with the upper side of a globular article, it is rolled along guideways in a compound rotation, which periodically moves a projection of the article through the slot of the guideways. Such compound rotation is effected by moving pad means above guideways in a direction generally lengthwise of the guideways. Such pad means are spaced parallel belts one of which travels faster than the other. Knife blades are rotated closely beneath the guideways to sever projections of articles extending through the slot of the guideways.

5 Claims, 10 Drawing Figures

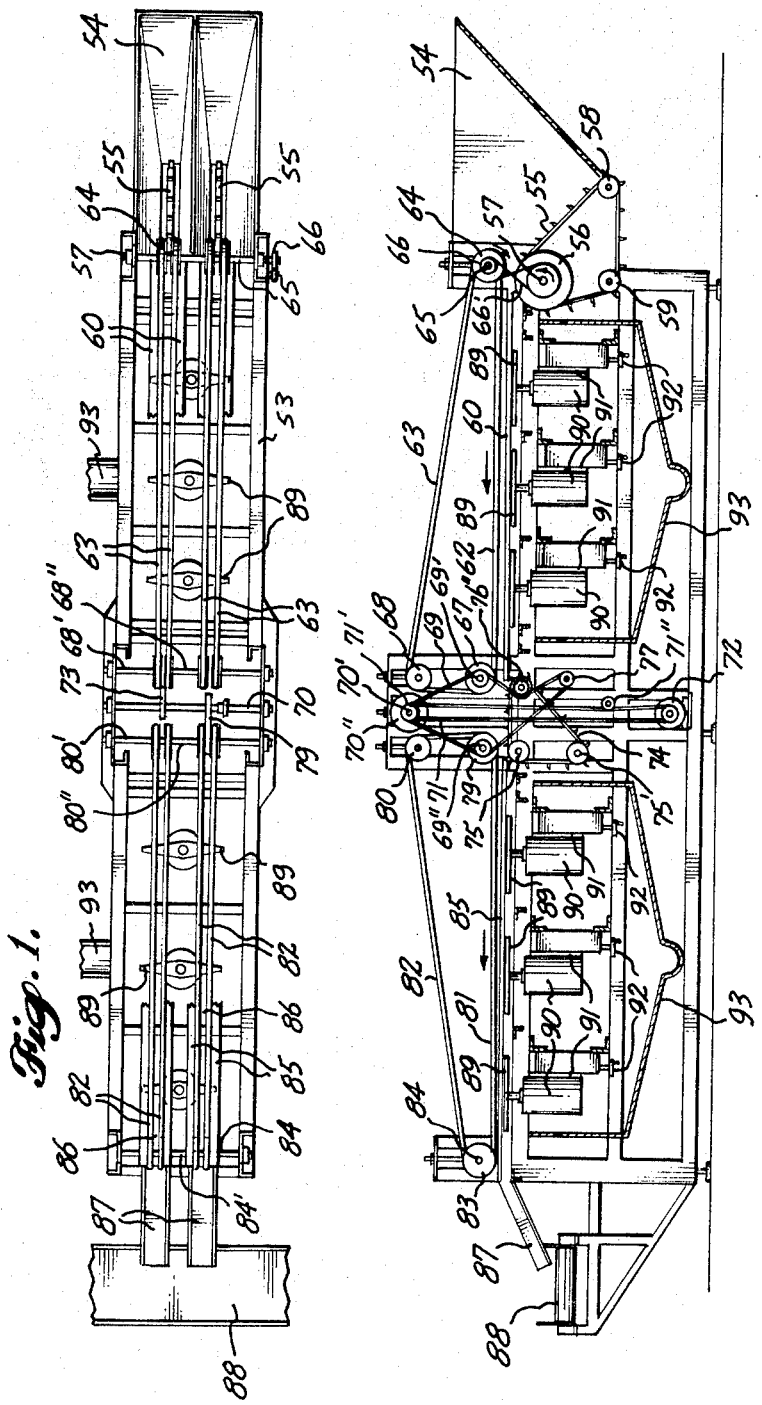

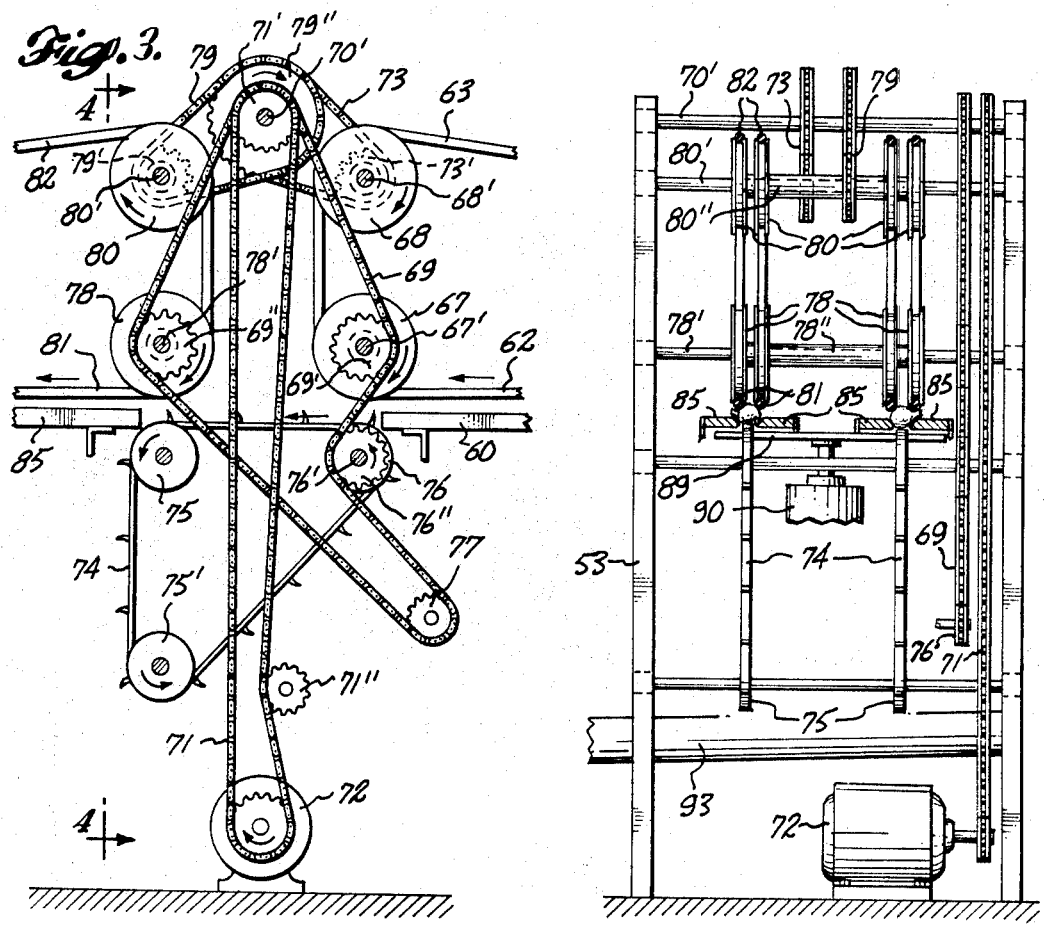
Fig. 3.
Fig. 4.
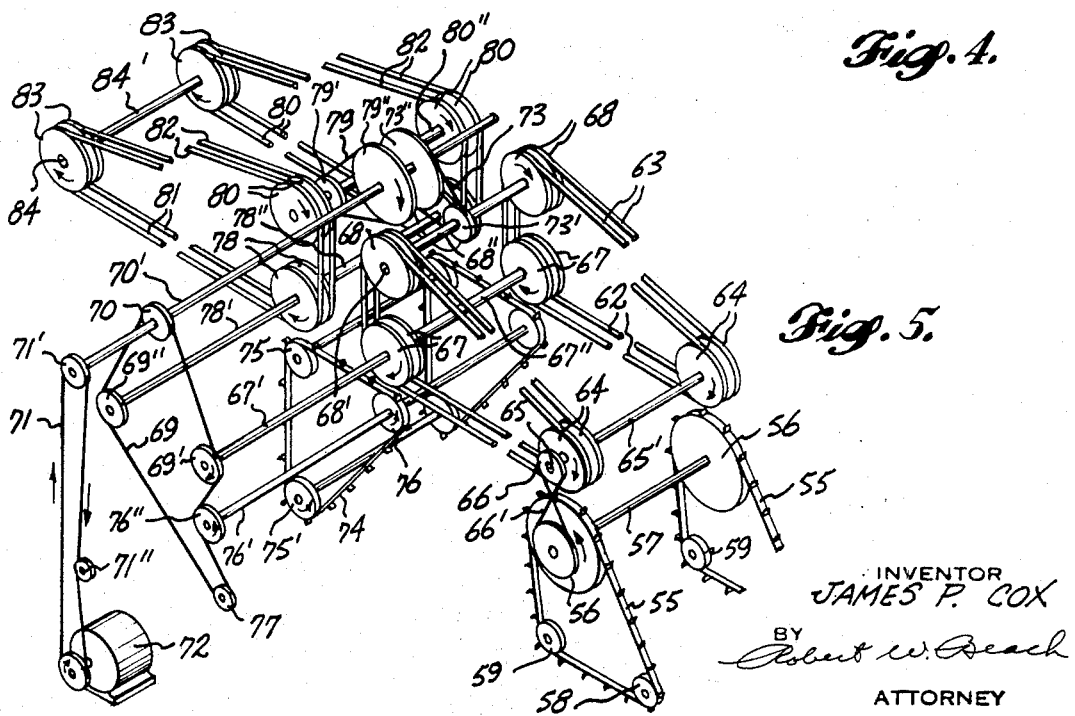
Fig. 5.
INVENTOR
JAMES P. COX
BY
Robert W. Beach
ATTORNEY

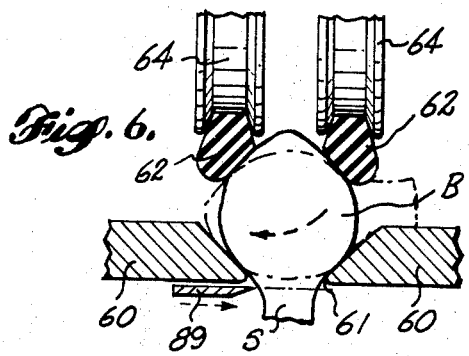
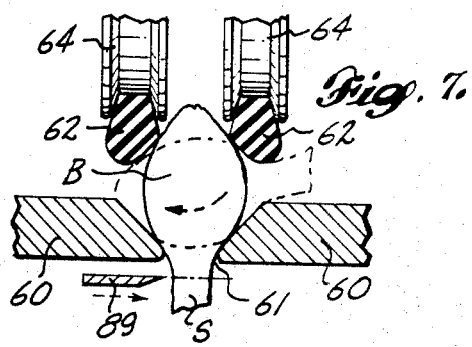
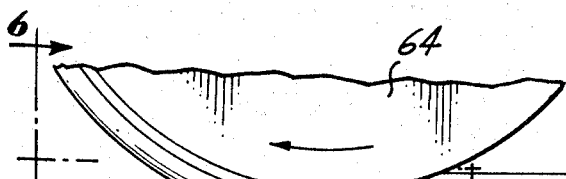
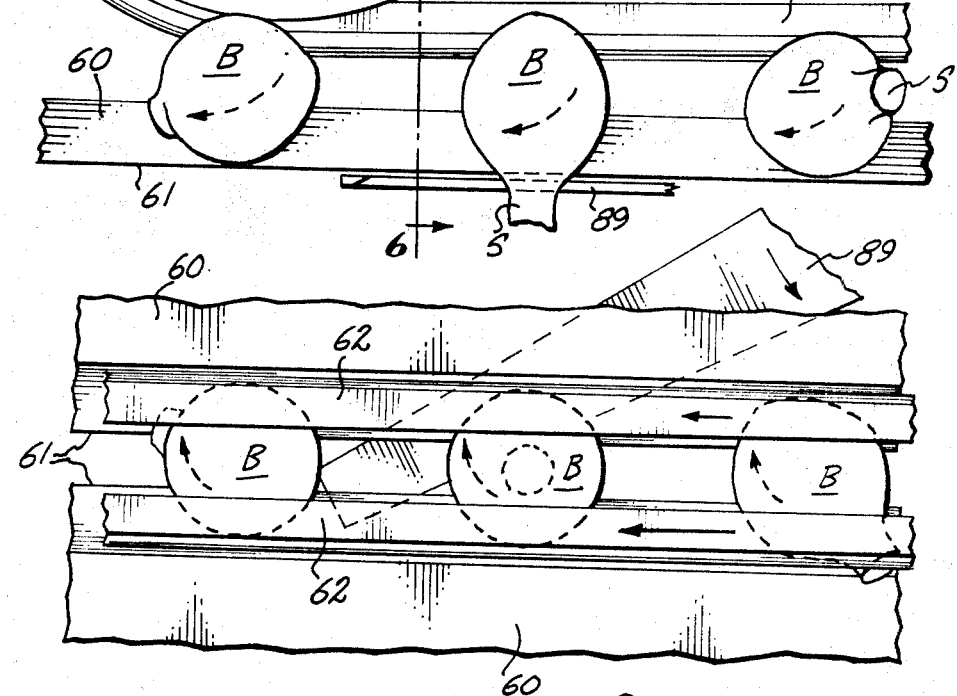
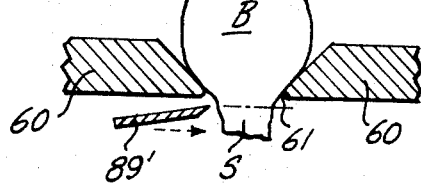
INVENTOR
JAMES P. COX
BY
Robert W. Beach
ATTORNEY

DUAL BELT MACHINE FOR TRIMMING PROJECTIONS FROM GLOBULAR ARTICLES

This application is a division of application, Ser. No. 707,152 filed Feb. 21, 1968 for Machine for Trimming Projections from Globular Articles, now U.S. Pat. No. 3,538,969.

Brussels sprouts are globular articles, the bodies of which are generally spherical or elongated lengthwise of the stem, to a greater or lesser extent, in the shape of an ellipsoid. The stem projection varies in length and its end is usually more or less uneven or ragged. Heretofore, the stems of such Brussels sprouts have been trimmed by hand manipulation, which has required at least that each Brussels sprout be picked up individually in effecting a stem-trimming operation.

The principal object of the present invention, therefore, is to provide a machine for trimming projections from globular articles, such as the stems of Brussels sprouts, automatically, reliably, and uniformly, so that it is not necessary to manipulate manually each individual article, either during the trimming operation or prior thereto, for the purpose of orienting the article in the proper position for a subsequent trimming operation.

Another object is to provide a machine which will trim projections from globular articles automatically, irrespective of minor variations in shape of the article from generally spherical or ellipsoidal and irrespective of variations in size of such articles within predetermined limits.

It is also a preferred object to provide such a machine which can be adjusted to accommodate articles of different size ranges.

Another object is to provide a machine for trimming projections of globular articles, such as Brussels sprouts, which, while effective, will engage and handle the articles gently so as to avoid or minimize injuring the Brussels sprouts by the necessary manipulation of them.

A particular object is to accomplish the projection-trimming operation by placing the globular article relative to the slot of a machine so that the projection extends through the slot for engagement by a projection-trimming device at the side of the slot opposite the article.

FIG. 1 is a plan of the projection-trimming machine;

FIG. 2 is a side elevation of such machine with parts broken away;

FIG. 3 is an enlarged side elevation of the central portion of such machine with parts broken away;

FIG. 4 is a transverse vertical section through the machine on line 4—4 of FIG. 3;

FIG. 5 is a top perspective of the transport system of this machine with parts broken away;

FIGS. 6 and 7 are detail vertical transverse sections through a portion of the machine shown in FIGS. 1 and 2 on an enlarged scale, taken on line 6—6 of FIG. 8, and showing parts in different adjusted positions;

FIG. 8 is a side elevation of a fragmentary portion on an enlarged scale of the machine shown in FIGS. 1 and 2;

FIG. 9 is a plan of such machine section;

FIG. 10 is an enlarged detail transverse vertical section through a portion of the machine corresponding to FIGS. 6 and 7, but showing a somewhat modified structure.

There is no appreciable problem in trimming projections of globular articles, such as the stems of Brussels sprouts, if such stems can be positioned predictably with relation to suitable projection-trimming means. The difficult problem is to arrange for placement of such articles without individual manual manipulation so as to position the projections reliably and automatically for engagement by the trimming means. Conveniently, the projection of a globular article can be located by a slot having trimming means at one side of it. The objective then is to orient each globular article automatically so that its projection is placed in registry with such slot and is then extended through the slot into position for engagement by the trimming means.

In the machine shown in FIGS. 1 to 10, inclusive, the machine frame 53 has a vertically divided hopper 54 mounted on one end of it. Finger flight elevating conveyors 55 run through the bottoms of these hoppers and extend around idler pulleys 58 and 59. The flight conveyors 55 feed globular articles, such as Brussels sprouts, from the sections of supply hopper 54 to guideways formed by guide rails 60 shown in FIGS. 1, 2 and 6 to 9. Such guide rails have adjacent oppositely inclined surfaces spaced apart to form slots 61 between them, as shown in FIGS. 6, 7 and 9 in particular.

Above the guideways formed by guide rails 60, two of which guideways are shown in FIG. 1, run the lower stretches 62 of a pair of belts spaced transversely of the guideways. As seen in FIGS. 2 and 5, such endless belts have upper stretches 63. The feed ends of the belt loops are carried by pulleys 64, the outer ones of which are mounted on shaft 65. This shaft also carries a pulley 66 driving a crossed belt 66' for turning shaft 57 on which pulleys 56 are mounted to power the finger flight conveyors 55. The opposite ends of the belt loops 62,63 are carried by lower pulleys 67 and upper pulleys 68. Inner pulleys 64 are mounted on a sleeve 65' rotatable independently of shaft 65; similarly, inner pulleys 67 are mounted on sleeve 67" and inner pulleys 68 are mounted on sleeve 68".

In order to afford sufficient length of travel of the globular articles to insure proper trimming of their projections without the lower stretches 62 of the belts sagging excessively, it may be desirable for two sets of belts arranged in tandem to be used as shown in FIGS. 1, 2, 3 and 5. The drive mechanism for both sets of belts can then be located at the center of the machine. Also, while two article paths through the machine have been shown, it will be evident that only one such path, or more than two such paths, could be provided. Particularly FIGS. 3 and 5 show drive connections for the various belts.

The lower stretches 62 of the belts closely overlie the guideway formed by the guide rails 60 having slot 61 between them as shown in FIGS. 6, 7 and 8. Such guide rails are spaced apart the desired distance to accommodate globular articles of a selected size. In FIG. 6 the guide rails 60 are spaced farther apart than such guide rails shown in FIG. 7. As illustrated, the size of Brussels sprouts to be accommodated in the guideway shown in FIG. 6 will be larger than the Brussels sprouts to be accommodated in the guideway shown in FIG. 7. The important variable in the guideway shown in FIGS. 6 and 7 is the spacing between the adjacent edges of the guide rails 60 forming the guideway slots 61. Unless there is a great difference in size between the articles to be processed in machines having two guideway sizes, the spacing between the lower belt stretches 62 can be the same and, also, the spacing between the belt stretches and the guide rails 60 probably need not be altered.

The endless belts having lower stretches 62 and upper stretches 63 constitute pad means, such as by being made of soft resilient material. Such belts may be made of sponge plastic material and the tension strength of such material can be supplemented as may be desired by the belts including in their structure cords or webs of fabric, or even wire or cable cores, to insure that the driving tension to which the belts are subjected can be transmitted reliably. At the same time, the material at the surface of the belts must be sufficiently deformable and resilient as to be able to engage opposite sides of the upper portion of a globular object, as shown in FIGS. 6 and 7, without injuring a rather delicate product such as a Brussels sprout.

Brussels sprouts may be delivered by the finger flight conveyors 55 from the supply hoppers 54 in positions with the stems substantially horizontal and extending transversely of the slots 61 of the guideways, as shown in broken lines in FIGS. 6 and 7. In order to be able to trim the stems of the Brussels sprouts, they must be repositioned so that their stems extend through the guideway slots 61, as shown in full lines in FIGS. 6 and 7, and in the central position shown in FIGS. 8 and 9. Consequently, it is necessary not only to convey the Brussels sprouts along the guideways, but to rotate them so that their stems will be swung from the broken-line position of FIG. 6 or FIG. 7 to the solid-line position of either figure automatically. Such repositioning can be accomplished by effecting compound rotation of a Brussels sprout so that the Brussels sprout not only rolls along the guideways and rotates about a horizontal axis extending transversely of the slot 61 but, also, rotates about a different axis.

To exert a force component on a Brussels sprout transversely of the length of a slot 61 so as to rotate the Brussels sprout about an axis at an angle to the axis of roll extending transversely of the slot, one belt of each pair will travel at a speed different from that at which the other belt of such pair travels and such difference in speed may be such that one belt travels from 50 percent to 150 percent faster than the other belt. Thus, the linear speed of the inner or adjacent belts of the two pairs of the belts shown in FIGS. 1, 4 and 5 may be twice as great, for example, as the linear speed of the outer or remote belts. As an example, the linear speed of the outer belts may be 100 feet per minute and the linear speed of the inner belts may be from 150 feet per minute to 250 feet per minute. The result will be that the Brussels sprouts not only will be rolled along the guideways by the lower belt stretches 62, but engagement of such belt stretches with the Brussels sprouts will also twirl the sprouts. The resulting gyrations of the Brussels sprouts will swing the stems transversely of the lengths of the slots 61 so that periodically and sporadically the stems will be plunged down through the slots as the heads of the Brussels sprouts roll along the guideways formed by the guide rails 60.

The outer belts 62,63 are driven by rotation of shaft 67' on which the outer pulleys 67 are mounted. A chain drive, shown best in FIG. 3, includes a chain 69 engaging a sprocket 69' secured on shaft 67'. This chain is driven by a sprocket 70 mounted on shaft 70', which, in turn, is driven by a chain 71 turning a sprocket 71' secured on shaft 70'. This chain is driven by a motor 72 and a chain-tightener sprocket 71" keeps the chain loop between the motor and sprocket 71' tight. The outer pulleys 68 on shaft 68' over which the outer belts run are simply idler pulleys. Similarly, the outer pulleys 64 on shaft 67 are idler pulleys as far as the outer belts are concerned, but these pulleys are secured on shaft 65 so that they will turn such shaft and sprocket 66 carried on it to drive shaft 57 for the finger flight elevator conveyors by crossed belt 66' as described above.

The inner belts 62,63 of the belt pairs are driven from the same power source as the outer belts, although at a higher speed. These belts are driven by the inner pulleys 68, which are secured on opposite ends of a sleeve or tube 68" that fits rotatively on the inner shaft 68'. Spacers may be provided between the pulleys 68 for the belts of each pair in order to maintain proper spacing between the belts and to keep the tube 68" centered between the outer pulleys 68. The tube or hollow shaft 68" is driven to turn the inner pulleys 68 by a chain 73 which is engaged with a sprocket 73' secured on the hollow shaft 68". Such chain, in turn, is driven by a sprocket 73" secured on shaft 70'. The ratio of the diameters of sprockets 73", 70 and 69' establishes the relative linear speeds of the inner and outer belts. Thus, the diameter of sprocket 73" can be twice as great as the diameter of either sprocket 70 or sprocket 69' if the diameters of these latter sprockets are equal.

If the transport mechanism for the Brussels sprouts is divided generally in half, as shown in FIGS. 1, 2 and 5 in particular, the second half of such system will be substantially the mirror image of the first half. In such an installation it is necessary to transfer the Brussels sprouts from the discharge end of the first stem-trimming conveyor section to the feed end of the second stem-trimming conveyor section. Such transfer can be accomplished by finger flight conveyors 74 shown more or less diagrammatically in FIGS. 3, 4 and 5. While these figures illustrate such conveyors as having unconfined article transporting upper stretches, such stretches actually will move through slotted troughs forming continuations of the guideways defined by the guide rails 60 shown in FIGS. 6, 7, 8 and 9. Such transfer conveyor may be driven by the same motor 72 as drives the two stem-trimming conveyor sections. Thus, as shown in FIGS. 3 and 5, the transfer conveyor belt 74 extends around two idler pulleys 75 and 75' and a driving pulley 76. This driving pulley is mounted on a shaft 76' on which a drive sprocket 76" is secured that is engaged by drive chain 69.

Drive chain 69 is tightened by a tightener sprocket 77 to hold such chain in position laced around sprockets 70, 69', 76" and 69". Sprocket 69" is secured on shaft 78' on which the outer pulleys 78 of the second stem-trimming conveyor sections are secured. While the outer lower pulleys 78 are driven by chain 69 through sprocket 69" and shaft 78', the same chain drives sprocket 70 to turn shaft 70' for driving sprocket 79' and chain 79 to turn the inner pulleys 80 of the upper belt-supporting pulleys.

The belts for moving the articles through the second projection-trimming section of the machine have lower stretches 81 and upper stretches 82 and the feed ends of such belt loops are supported by the pulleys 78 and 80 while the discharge ends of such belt loops extend around pulleys 83. The outer belts are driven by their pulleys 78 on shaft 78', while the pulleys 78 engaged by the inner belts are mounted on the tube or hollow shaft 78" encircling shaft 78'. Suitable spacers or thrust means are interposed between the pulleys 78 of each pair to maintain proper spacing of the belts and to keep the hollow shaft centered between the two outer pulleys 78. For this purpose, the ends of shaft 78" may serve as thrust bearings engaging the central portions of the outer pulleys 78 as shown in FIG. 4.

Chain 79 connects sprocket 79' secured on hollow shaft 80" and sprocket 79" secured on shaft 70'. A tube or hollow shaft 80" carries the inner pulleys 80 so that they are rotatable independently of the outer pulleys 80 and shaft 80' on which such outer pulleys are mounted. As in the case of hollow shaft 78', the inner pulleys 80 may be secured to hollow shaft 80" at locations spaced from its ends so that the end portion of such hollow shaft may be in thrust bearing engagement with the central portions of the outer pulleys 80 to maintain the inner pulleys 80 in proper spaced relationship to the outer pulleys and to hold the hollow shaft 80" centered between the outer pulleys 80.

The inner pulleys 83 are rotatively independent of the outer pulleys 83 by mounting such outer pulleys on opposite end portions of the shaft 84 and mounting the inner pulleys 83 on a tube or hollow shaft 84' fitted over shaft 84. Again, the ends of such hollow shaft can be in thrust bearing engagement with the central portions of the outer pulleys 83 for maintaining such tube centered between those pulleys and, also, maintaining the inner pulleys 83 in proper spaced relationship to the outer pulleys 83.

The second projection-trimming transport conveyor section of the machine shown in FIGS. 1 and 2 as being in tandem relationship to the first section also has guideways for the Brussels sprouts or other globular articles closely underlying the lower stretches 81 of the second belt pairs. Guide rails 85, spaced apart to provide slots 86 between them, as shown in FIGS. 1, 3 and 4, can form the guideways. These guideways operate in the same manner as the guideways formed by the guide rails 60 as described in connection with FIGS. 6, 7, 8 and 9. From this second conveyor section the articles are discharged into chutes 87 by which they are deposited into any suitable receptacle, such as a conveyor 88.

During the passage of the articles through the second section of the conveying mechanism, the articles will again be gyrated as they are rolled along the guideways in order to plunge their projections periodically and sporadically through the slots of the guideways. When the stems or projections extend through such slots, further opportunity is afforded for them to be trimmed. Particularly in FIGS. 2 and 4, rapidly whirling projection-trimming blades 89 are shown as being mounted close beneath the guideways. Three rotary trimming blades are shown in each section in FIGS. 1 and 2. These blades are rotated independently, each by its own drive motor 90. Each of these motors is mounted on a slide 91 for vertical adjustment by rotation of a crank wheel 92 as shown in FIG. 2, which turns an adjusting screw for moving the slide. Beneath each section of the machine a hopper 93 may be provided to receive trimmings of projections such as stems and outer leaves of Brussels sprouts.

In FIG. 10 a modified type of projection-trimming blade arrangement is shown which can be used in the machine of FIGS. 1 to 9. In this instance, the rotary blade 89' is canted or twisted so as to incline the blade and elevate its leading cutting edge. It is easier to position the cutting edge of such an inclined blade in close proximity to the bottom of the guideways. Also, engagement of such a canted blade edge with the article projection, such as the stem of a Brussels sprout, will tend to draw that stem farther downward through the slot 61 or the cutting edge will tend to slice upwardly through the stem or both. Consequently, a very close trimming operation can be accomplished by using a blade of this type.

I claim:

1. In a machine for trimming projections from globular articles including a guideway having an elongated slot extending therealong of a width greater than the width of the projection of such a globular article and guiding the article in engagement therewith for movement along such slot, the improvement comprising means for effecting movement of the globular article involving rolling along the guideway combined with turning to swing the article projection transversely of the length of the slot into registry with and to project it through the slot including two belts spaced apart transversely of their lengths and spaced from the guideway a distance sufficient to receive such globular article between said belts and the guideway and engageable with spaced portions of a side of the globular article generally opposite the guideway and moving means effecting relative movement of said belts and the guideway, and trimming means at the side of the guideway remote from said belts for trimming globular article projections extending through the slot.

2. The machine defined in claim 1, the moving means for the belts effecting movement of one belt at a speed greater than the speed of the other belt.

3. In a machine for trimming projections from globular articles, the combination of a pair of generally straight horizontal guideway strips having substantially flat bottoms and spaced apart for forming therebetween an elongated slot of a width greater than the width of the projection of such a globular article and said strips being of a thickness and adjacent sides of said strips flaring upwardly for enabling the root of the projection to be disposed substantially flush with the strip bottoms, said strips guiding the article in engagement therewith for movement along the slot, article-engaging means spaced from said guideway strips and engageable with such globular article, means effecting relative movement of said article-engaging means and said guideway strips for moving the globular article involving rolling along the guideway strips combined with turning to swing the article projection transversely of the length of the slot into registry with and to project it through the slot, and trimming means at the side of said guideway strips remote from said article-engaging means for trimming such projection extending through the slot including an elongated cutting blade, and means guiding said cutting blade for swinging movement about an upright axis to swing its cutting edge in close proximity to said substantially flat bottoms of said guideway strips for cutting off substantially the entire projection of the article.

4. In a machine for trimming projections from globular articles, the combination of a pair of generally straight horizontal guideway strips having substantially flat bottoms and spaced apart for forming therebetween an elongated slot of a width greater than the width of the projection of such a globular article and said strips being of a thickness and adjacent sides of said strips flaring upwardly for enabling the root of the projection to be disposed substantially flush with the strip bottoms, said strips guiding the article in engagement therewith for movement along the slot, article-engaging means spaced from said guideway strips and engageable with such globular article, means effecting relative movement of said article-engaging means and said guideway strips for moving the globular article involving rolling along the guideway strips to swing the article projection into registry with and to project it through the slot, and trimming means at the side of said guideway strips remote from said article-engaging means for trimming such projection extending through the slot including an elongated cutting blade and means guiding said blade for swinging about an upright axis to move its cutting edge in close proximity to said substantially flat bottoms of said guideway strips for cutting off substantially the entire projection of the article.

5. In a machine for moving globular articles, the improvement comprising two belts having their lengths disposed substantially parallel and spaced apart transversely of their lengths to receive such a globular article between said belts for engaging spaced portions of the globular article, moving means effecting lengthwise movement of said belts in engagement with the globular article, engaging means engaging the side of the globular article generally opposite said belts for effecting rolling movement of the globular article between said belts and the engaging means, and trimming means at the side of said guideway strips remote from said article-engaging means for trimming such projection extending through the slot including an elongated cutting blade and means guiding said blade for swinging about an upright axis to move its cutting edge in close proximity to said substantially flat bottoms of said guideway strips for cutting off substantially the entire projection of the article.

* * * * *

PO-1050
(5/69)

UNITED STATES PATENT OFFICE
CERTIFICATE OF CORRECTION

Patent No. 3,669,164        Dated June 13, 1972

Inventor(s) James P. Cox

It is certified that error appears in the above-identified patent and that said Letters Patent are hereby corrected as shown below:

Column 6, lines 34 and 35, cancel "moving globular articles, the improvement comprising" and insert --trimming projections from globular articles, the combination of a pair of generally straight horizontal guideway strips having substantially flat bottoms and spaced apart for forming therebetween an elongated slot of a width greater than the width of the projection of such a globular article,--; line 44, cancel "article-".

Signed and sealed this 1st day of May 1973.

(SEAL)
Attest:

EDWARD M. FLETCHER, JR.      ROBERT GOTTSCHALK
Attesting Officer                 Commissioner of Patents